C. J. BROCKBANK.
FILTERING APPARATUS.
APPLICATION FILED JAN. 7, 1914.
1,152,875.
Patented Sept. 7, 1915.
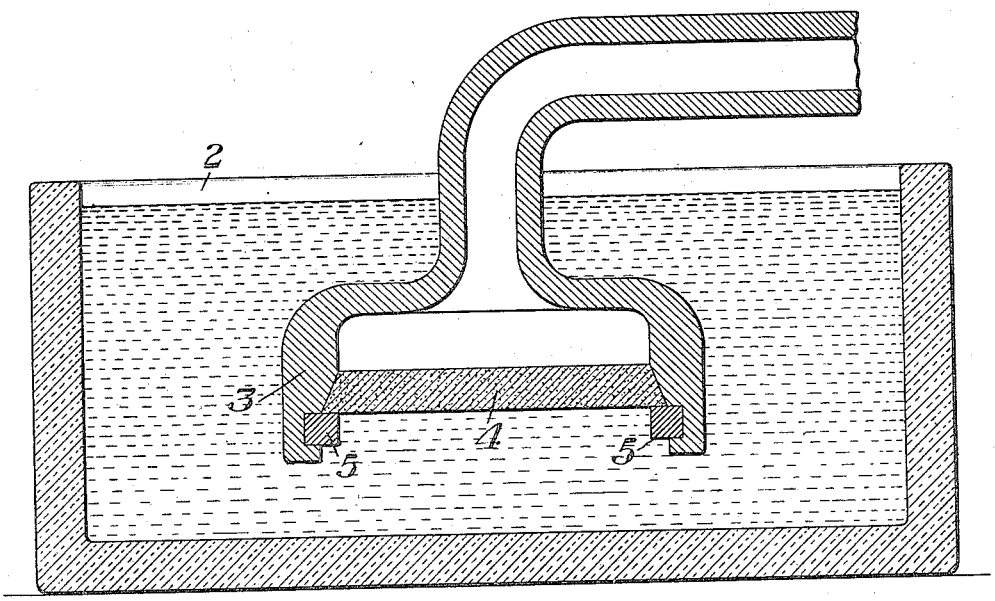
WITNESSES
INVENTOR

UNITED STATES PATENT OFFICE.

CLARENCE J. BROCKBANK, OF NIAGARA FALLS, ONTARIO, CANADA, ASSIGNOR TO THE CARBORUNDUM COMPANY, OF NIAGARA FALLS, NEW YORK, A CORPORATION OF PENNSYLVANIA.

FILTERING APPARATUS.

1,152,875.   Specification of Letters Patent.   Patented Sept. 7, 1915.

Application filed January 7, 1914. Serial No. 810,759.

*To all whom it may concern:*

Be it known that I, CLARENCE J. BROCKBANK, a subject of the King of Great Britain, residing at Niagara Falls, Ontario, Canada, have invented a new and useful Improvement in Filtering Apparatus, of which the following is a full, clear, and exact description, reference being had to the accompanying drawings, forming part of this specification, in which the figure is a diagrammatic vertical section showing one form of filter constructed in accordance with my invention.

My invention relates to the filtering of slimes and liquids carrying suspended solids; and particularly filtering of corrosive liquids such as acids which have a corrosive action on the apparatus employed. It is also particularly designed for filters of the submerged type in which the fluid to be filtered is forced through the filtering diaphragm by difference in pressure between the two sides of this filter plate or diaphragm, such, for example, as shown in United States Patent No. 764,486, granted to George Moore, on July 5, 1904.

The invention consists in providing a filter plate of acid resisting material, which is set in a suction element consisting preferably of silicon or silicon alloy. The filter plate or diaphragm is preferably composed of compacted carborundum of a uniformly porous structure and composed of very fine crystals bound together without a foreign binder, such, for example, as described in United States Patent No. 992,698, granted to Frank J. Tone on May 16, 1911. This diaphragm is resistant to nearly all acids, including hydrochloric, sulphuric and nitric acids.

In the drawing, in which I show one form of my invention, 2 represents a resistant filtering receptacle in which is submerged the bell-shaped filter holder 3. This filter holder is preferably circular in form and is formed of cast silicon or silicon alloy, which is highly resistant to acids. In the mouth of this bell-shaped holder is closely fitted the carborundum filter 4, which may have tapering sides to fit corresponding tapered surfaces in the mouth of the holder, it being keyed in by blocks 5 of silicon. The silicon may be cast upon and around the carborundum plate or the holder may be removably secured in any desirable manner. The bell-shaped holder being connected up to any suitable source of suction, the liquid bearing the suspended solids is drawn through the filter plate to give the filter action. The solids in this case will be deposited upon the outer face of the plate and may be removed from the plate intermittently, either by withdrawing the plate, reversing the pressure, or in any other desirable way.

My invention is especially desirable in the concentration of muddy acids such as are obtained in the manufacture of explosives. Unless the muddy sediment is removed from these acids they are very difficult to concentrate.

The advantages of my invention result from the simple and effective filtering device which is acid resistant both as to plate and holder.

Many changes may be made in the form and arrangement of the apparatus without departing from my invention, as I consider myself the first to use a filter plate of acid resisting material set in a support formed of silicon or silicon alloy.

By the word "silicon" in my claims, I intend to cover either silicon or silicon alloy.

I claim:

1. A filter device comprising a filter plate of carborundum free from any foreign binding substance, and a carrier or support therefor of acid resisting material.

2. A filter device comprising a filter plate of carborundum free from any foreign binding substance, and a carrier or support therefor of silicon.

3. A filter device comprising a filter plate of carborundum free from any foreign binding substance, and a carrier or support therefor of acid resisting material, together with acid resisting keying means for securing the filter plate in the carrier or support.

In testimony whereof, I have hereunto set my hand.

CLARENCE J. BROCKBANK.

Witnesses:
  W. J. FAWCETT,
  H. C. MARTIN.